United States Patent [19]
Dougherty

[11] Patent Number: 5,035,162
[45] Date of Patent: Jul. 30, 1991

[54] INNER TIE ROD TOOL

[76] Inventor: David P. Dougherty, 6200 W. 128th St., Palos Heights, Ill. 60463

[21] Appl. No.: 528,220

[22] Filed: May 24, 1990

Related U.S. Application Data

[63] Continuation-in-part of Ser. No. 424,073, Oct. 19, 1989, abandoned.

[51] Int. Cl.$^5$ ............................................. B25B 13/06
[52] U.S. Cl. .................................. 81/124.4; 81/124.6
[58] Field of Search ........................ 81/124.3–124.6, 81/177.2, 177.1, 177.85

[56] References Cited

U.S. PATENT DOCUMENTS 1,596,708  8/1926  Bellows .
1,618,715  2/1927  Lammers et al. .
1,619,255  3/1927  Haynes ............................ 81/124.5 X
2,618,189  11/1952 Almes .
2,848,916  8/1958  Reynolds .
2,878,701  3/1959  Weersma .
3,590,235  6/1971  Lee .
4,048,875  9/1977  Heinen et al. .

OTHER PUBLICATIONS

Moog Catalog Cover and Page 10 Showing Moog T-497 Inner Tie Rod Tool.
Installation Instructions, Form 3048, for Moog T-497 Inner Tie Rod Tool.

Primary Examiner—D. S. Meislin
Attorney, Agent, or Firm—Lee, Mann, Smith, McWilliams & Sweeney

[57] ABSTRACT

An inner tie rod tool which facilitates removal and replacement of the inner tie rod of a rack and pinion steering mechanism of a vehicle without requiring the removal of the entire rack and pinion assembly. The inner tie rod tool includes a shaft having first and second ends and a longitudinal bore extending within the shaft. The bore defines a plurality of hexagonal sockets of various diameters being arranged coaxially adjacent to one another at the first end of the shaft adapted for use with tie rods having hexagonal ends. A claw having spaced-apart parallel jaws is attached to the first end for use with tie rods having cylindrical shaped ends with spaced-apart flat surfaces.

2 Claims, 4 Drawing Sheets

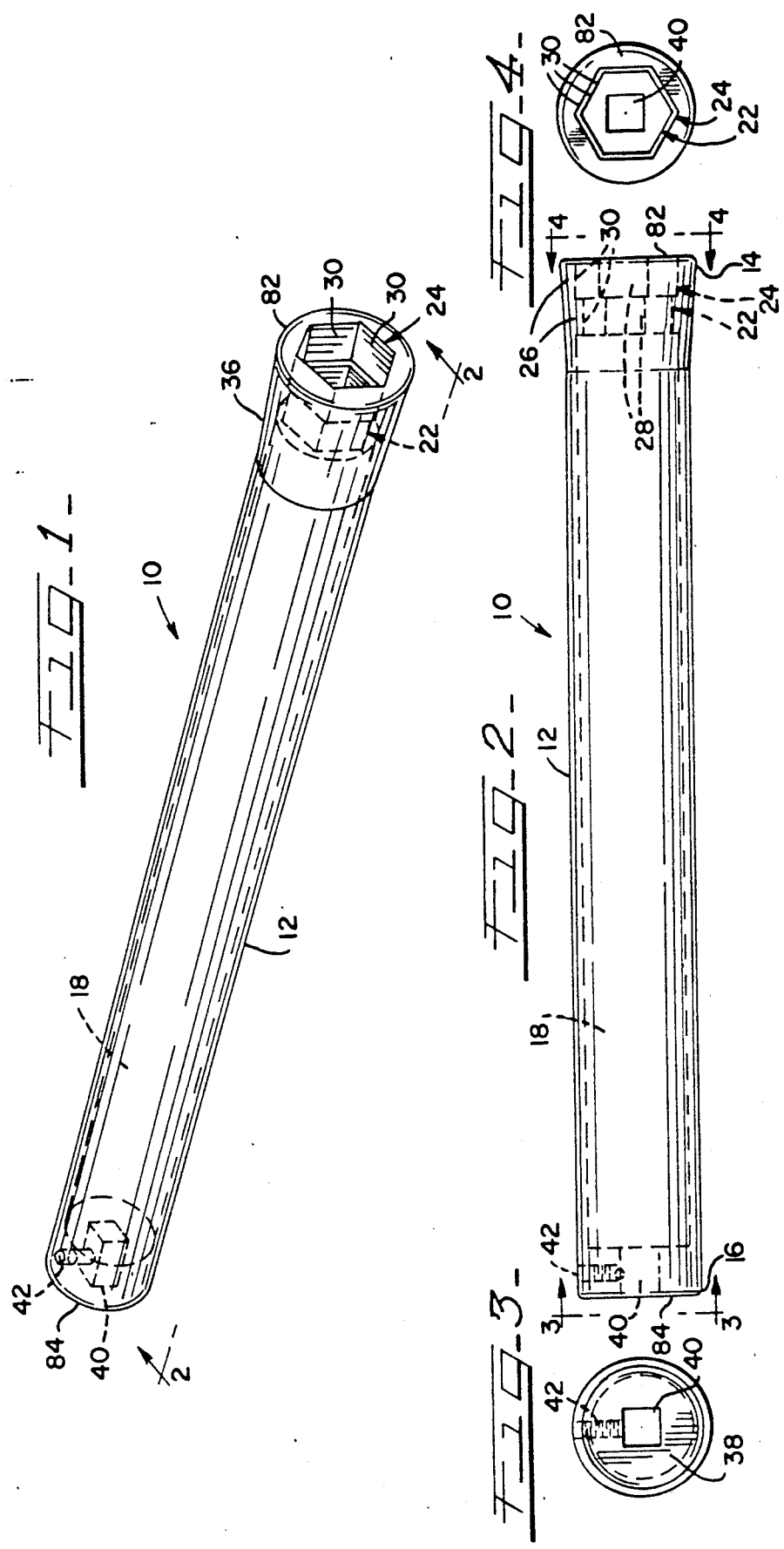

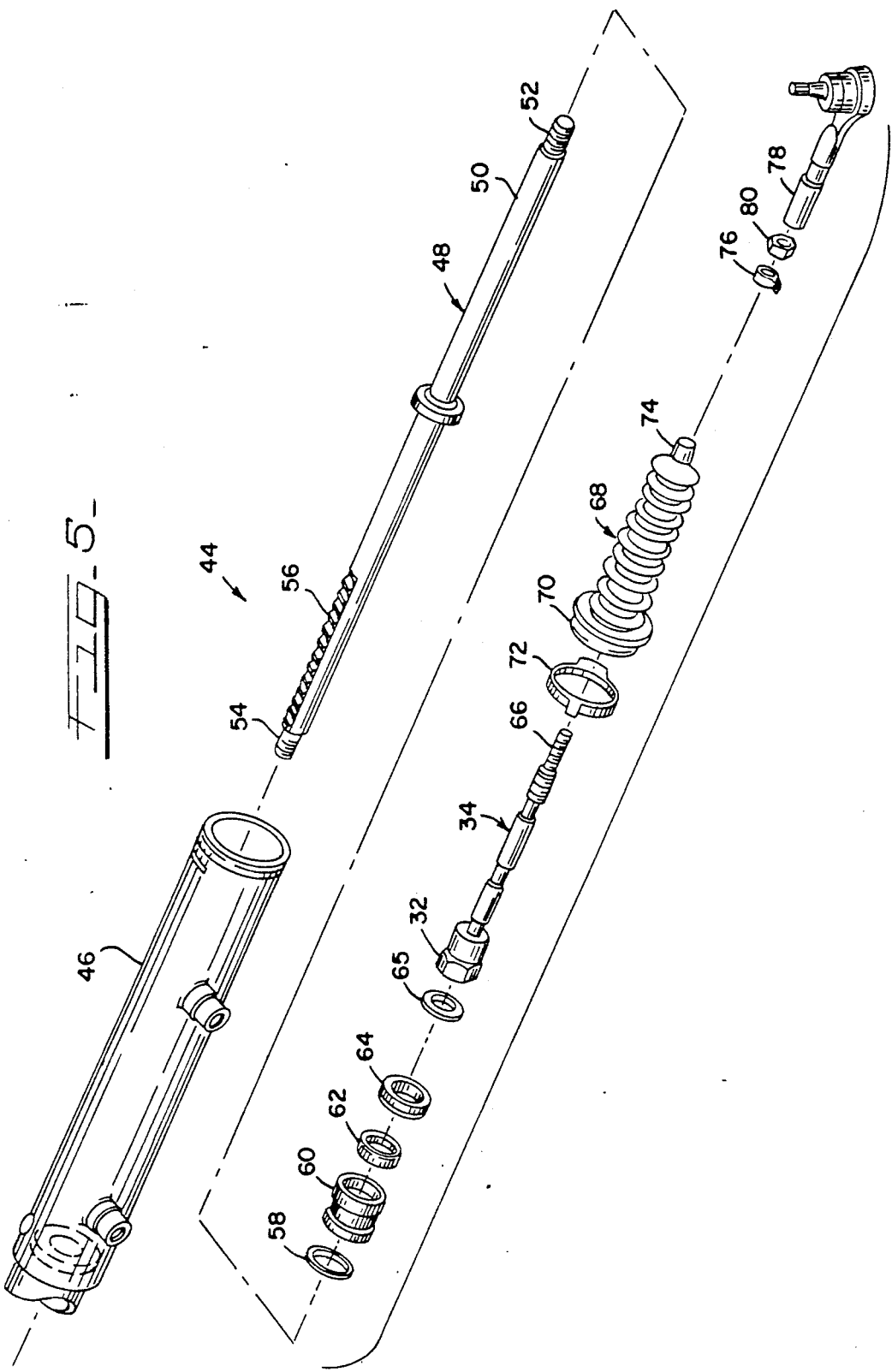

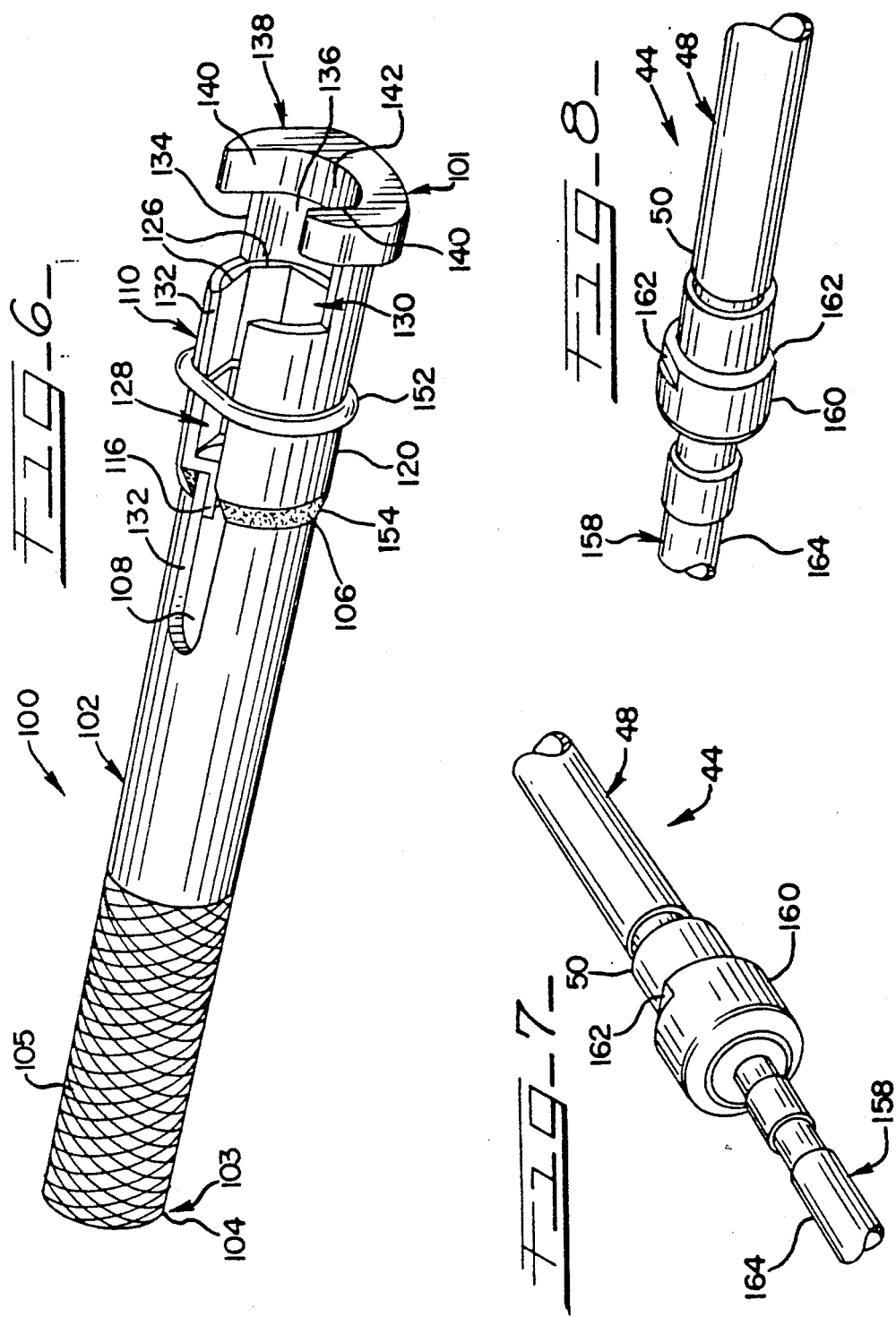

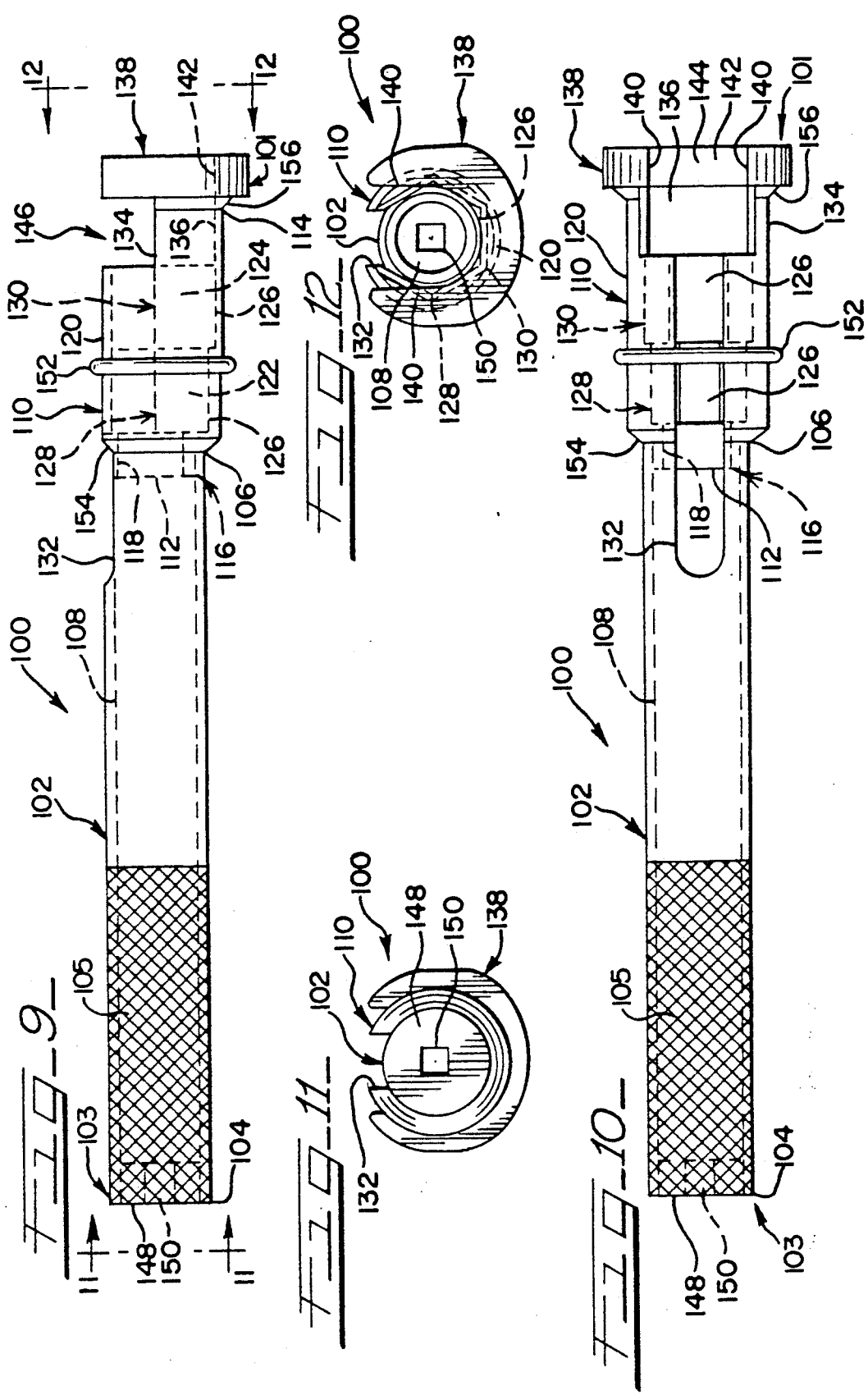

INNER TIE ROD TOOL

RELATED APPLICATIONS

This is a continuation-in-part of United States patent application Ser. No. 424,073, filed Oct. 19, 1989 now abandoned.

BACKGROUND OF THE INVENTION

The present invention relates to tools which are used for the installation or removal of an inner tie rod in a rack and pinion steering mechanism without requiring the removal of the rack and pinion assembly from the vehicle.

An inner socket, more commonly referred to as an inner tie rod can be found on most cars. The inner tie rod is part of the steering system on vehicles equipped with a rack and pinion type of steering mechanism. A rack and pinion steering mechanism includes a left and a right inner tie rod, each extending respectively from opposite ends of the rack and pinion assembly. During the normal course of use of a vehicle, the inner tie rod may become bent, broken or otherwise damaged, thereby requiring that the damaged tie rod be removed and replaced with a new tie rod.

There are two different types of inner tie rods. One type of inner tie rod includes a cylindrical shaped end having a pair of parallel spaced-apart flat surfaces which facilitate the removal and installation of the tie rod. The other type of inner tie rod utilizes a hexagonal shaped end to facilitate the removal and replacement of the inner tie rod. Essentially all Ford, Chrysler and General Motors vehicles include either the hexagonal type of inner tie rod or the cylindrical type of inner tie rod.

While the inner tie rod has one hexagonal shaped end, or a cylindrical end having parallel surfaces, to accommodate a wrench for removal and replacement of the inner tie rod from the rack and pinion assembly, due to obstructions caused by various vehicle parts, the end of the inner tie rod cannot be easily accessed for removal with a wrench on the drivers side of the car, and in most instances, cannot be accessed on the passenger side of the car. Therefore, the normal method of removal and replacement of an inner tie rod involves removal and reinstallation of the entire rack and pinion assembly which is a very time consuming and costly process. Great savings in labor, costs and wear and tear on the pinion gear can be made by removing and replacing the inner tie rod with the rack and pinion assembly remaining in place on the vehicle.

In those cars where hexagonal inner tie rods are used, the left and right inner tie rods are supplied by the vehicle manufacturer having hexagonal ends of a certain size or diameter. Replacement hexagonal inner tie rod parts, however, are available with hexagonal ends in one of generally two different diameters. Therefore, any one hexagonal inner tie rod on a car may have a hexagonal end of two different possible sizes. The left and right inner tie rods on the same car may also be of different sizes. It is therefore particularly useful to have one tool which is capable of removing a variety of different sized hexagonal inner tie rods while the rack and pinion assembly remains in place on the vehicle. It is also particularly useful to have one tool which is capable of removing a variety of different sized hexagonal type of inner tie rods as well as the cylindrical type of inner tie rod.

SUMMARY OF THE INVENTION

The present invention provides an inner tie rod tool which is particularly useful for the removal and replacement of an inner tie rod on a rack and pinion type of steering mechanism without requiring the removal of the rack and pinion assembly from the vehicle. The first end of the shaft of the multiple socket tool is provided with a plurality of sockets, each of a different diameter, to be capable of engaging a variety of different sized hexagonal ends of an inner tie rod. A claw having a pair of spaced-apart parallel jaws is attached to the socket end of one embodiment of the tool which is capable of gripping the flat surfaces of inner tie rods having cylindrical ends. A slot extends from the socket end of the tool along the shaft of the tool to enable the tool to be inserted over the inner tie rod at an angle. The bore within the shaft is of sufficient diameter and length to accommodate the inner tie rod within the shaft. Attachment means are provided at the second end of the shaft for imparting rotation to the shaft.

DESCRIPTION OF THE DRAWINGS

FIG. 1 is a perspective view a first embodiment of the inner tie rod tool.

FIG. 2 is a side elevational view of the first embodiment of the inner tie rod tool showing the sockets and bore in phantom.

FIG. 3 is an end view of the first embodiment of the inner tie rod tool taken along lines 3—3 of FIG. 2.

FIG. 4 is an end view of the first embodiment of the inner tie rod tool taken along lines 4—4 of FIG. 2.

FIG. 5 is a partial exploded view of a rack and pinion steering mechanism.

FIG. 6 is a perspective view of a second embodiment of the inner tie rod tool.

FIG. 7 is a partial perspective view of an inner tie rod having a cylindrical end with flat surfaces attached to the rack.

FIG. 8 is a partial perspective view of the inner tie rod of FIG. 7 from a different angle.

FIG. 9 is a side elevational view of the second embodiment of the inner tie rod tool showing the sockets and bore in phantom.

FIG. 10 is a top plan view of the inner tie rod tool shown in FIG. 9.

FIG. 11 is an end view of the inner tie rod tool taken along lines 11—11 of FIG. 9.

FIG. 12 is an end view of the inner tie rod tool taken along lines 12—12 of FIG. 9.

DESCRIPTION OF THE PREFERRED EMBODIMENT

The inner tie rod tool 10 shown in FIG. 1 is comprised of an elongated shaft 12 having a first end 14 and a second end 16. A longitudinal bore 18 defines a chamber which extends through the elongated shaft 12 between the end 16 and an innermost socket to be described. The shaft 12 of this embodiment should be at least thirteen inches in length with the diameter of the bore 18 being a minimum of nine-sixteenths of an inch so as to receive the inner tie rod of the rack and pinion steering mechanism to be described later herein. The shaft 12 is preferably made of common pipe material strong enough to resist torsional stress.

Two sockets 22 and 24 are defined in the first end 14 of the shaft 12. Each socket 22 and 24 includes a circular wall 26 which defines a hollow inner chamber 28 having flat walls 30 in the shape of a regular hexagon. The inner diameter or size, measured perpendicular to and between opposing hexagonal walls 30, of the first socket 22 is one and three-sixteenths inches. The diameter of the second socket 24 is one and five-sixteenths inches. While a fewer or greater number of sockets may be used, and while different sizes of diameters may be used, including those of metric dimension, these two diameters of sockets 22 and 24 are preferred as they correspond to the two different diameters in which the hex end 32 of the inner socket or inner tie rod 34, best shown in FIG. 5, is most commonly found.

Each socket 22 and 24 is located coaxially with the longitudinal axis of the shaft 12. The sockets 22 and 24 are located adjacent to one another in order of size or diameter, with the largest diameter socket 24 located at the first end 14 of the shaft 12. The socket 22 is located adjacent to the socket 24. The hexagonal walls 30 of the respective sockets 22 and 24 are aligned so that the walls 30 of each respective socket 22 and 24 are in parallel planes, as best shown in FIG. 4.

In one embodiment the sockets are formed within the first end 14 which is integral to the entire shaft 12 by heating the shaft 12 and inserting appropriately sized hexagonal dies. In another embodiment each of the sockets 22 and 24 may be made from the appropriate size of socket which is commonly available for attachment to a socket wrench by cutting away the base portion (not shown) of the socket, leaving only the socket wall. The sockets 22 and 24 have their circular walls 26 welded to one another and to the first end 14 of the shaft 12. Additional weld material may be deposited on the circular walls 26 of the sockets 22 and 24 so that the outer surfaces of the circular walls 26 may be machined into a smooth frusto-conical surface 36.

A circular disk 38 is located at the second end 16 of the shaft 12. The disk 38 is of the same approximate diameter as the outer diameter of shaft 12. A square aperture 40 extends through the disk 38 with the center of the aperture 40 being coaxial with the longitudinal axis of the shaft 12. The square aperture 40 is approximately one-half inch square to provide for the attachment of a socket wrench or impact wrench having a one-half inch drive. A second aperture 42 extends perpendicular from one wall of the aperture 40 to the outer surface of the shaft 12. The second aperture 42 provides means for attaching the multiple socket tool 10 to an impact wrench or socket wrench to prevent an unintentional separation of the tool 10 from the wrench. The exterior surface and ends of the multiple socket tool 10 may be given a chrome finish after the surfaces have been given a proper surface preparation. The chrome finish enhances the appearance of the multiple socket tool 10 and additionally provides a surface which may be easily cleaned.

A rack and pinion steering mechanism 44 is partially shown in FIG. 5. The tube 46 is attached to the vehicle. The rack 48 having a shaft 50 includes a pair of threaded ends 52, 54. The rack 48 extends through the tube 46 with each threaded end 52, 54 extending outside a respective end of tube 46. The shaft 50 includes a row of teeth 56 which are engaged by a pinion (not shown). Rotation of the pinion causes the rack 48 to move longitudinally in either desired direction within the tube 46. A seal assembly consisting of an O-ring 58, a bushing 60, a seal 62, a lock ring 64 and a shock damper 65 is placed concentrically around one end of the shaft 50 to create a seal between the shaft 50 and the inner wall of the tube 46. The inner tie rod 34 shown here has a hexagonal end 32 with internal threads and a threaded end 66 with external threads. The hexagonal end 32 of the inner tie rod 34 is threadably engaged to the threaded end 52 of the rack 48. A flexible boot 68 fits over the inner tie rod and has a first end 70 clamped to the end of the tube 46 by inner clamp 72 and a second end 74 which is clamped to the inner tie rod 34 by outer clamp 76. The outer tie rod 78 is threadably engaged to a threaded end 66 of the inner tie rod 34 and is additionally fastened thereto by lock nut 80.

The method of removing and replacing the inner tie rod 34 shown in FIG. 5 includes the initial steps of loosening the lock nut 80 and removing the outer tie rod 78 from the threaded end 66 of the inner tie rod 34. The outer clamp 76 and the inner clamp 72 are loosened so that the boot 68 may be removed from the inner tie rod 34 to expose the hexagonal end 32 of the inner tie rod 34.

The first end 82 of the tool 10 of FIG. 1 is placed over the threaded end 66 of the inner tie rod 34. The tool 10 is then translated longitudinally towards the hexagonal end 32 of the inner tie rod 34. As the first end 82 of the tool 10 reaches the hexagonal end 32, the tool 10 is rotated to align the hexagonal walls of the sockets 22 and 24 with the hexagonal surfaces of the hexagonal end 32. The tool 10 is then further moved toward the hexagonal end 32 until the hexagonal end 32 matingly engages a correspondingly sized socket 22 or 24. Any sockets which are larger in diameter than the hexagonal end 32, will pass by the hexagonal end 32 until a socket of the same size or diameter as the hexagonal end 32 matingly engages the hexagonal end 32.

A socket wrench or impact wrench is then inserted into the square aperture 40 of the second end 84 of the tool 10 to provide a counter clockwise rotation of the tool 10 thereby unscrewing the inner tie rod 34 from the rack 48, while the rack 48 and tube 46 remain attached to the vehicle. A new inner tie rod 34 is then replaced in essentially the reverse manner. As can be seen, the tool 10 is operative for the removal and replacement of inner tie rods 34 having various sizes of hexagonal ends 32.

A second embodiment of the present invention is shown in FIGS. 6 and 9 through 12 as inner tie rod tool 100. The inner tie rod tool 100 shown in FIG. 6 has a first end 101 and a second end 103 and includes an elongated shaft 102 having a first end 104 and a second end 106. A longitudinal bore 108 defines a chamber which extends through the shaft 102 from the first end 104 to the second end 106. The shaft 102 is approximately eleven inches in length and is preferably made of common pipe material strong enough to resist torsional stress. The outer surface of the shaft 102 may be knurled as illustrated at 105.

A fitting 110 having a first end 112 and a second end 114 is attached to the second end 106 of the shaft 102. The first end of the fitting 110 forms a stem 116 which is sized to fit closely within the bore 108 of the shaft 102. The stem 116 includes a bore 118 which is a minimum of nine-sixteenths of an inch in diameter for receiving the inner tie rod of the rack and pinion steering mechanism. The fitting 110 includes an outer wall 120 which defines chambers 122 and 124 within the fitting 110. The chambers 122 and 124 have flat walls 126 in the shape of a regular hexagon which define a first socket 128 and a second socket 130. The respective walls 126 of the sockets 128 and 130 are aligned with each other so as to be in parallel planes. A slot 132, approximately three-fourths of an inch wide, extends through the outer wall 120 of the sockets 128 and 130 to the chambers 122 and 124 and also extends through the walls of the stem 116 and of the shaft 102 to the bores 108 and 118.

The inner diameter or size, measured perpendicular to and between opposing hexagonal walls 126 of the first socket 128 is one and three-sixteenths inches. The diameter of the second socket 130 is one and five-sixteenths inches. While a fewer or greater number of sockets may be used, and while different sizes or diameters may be used, including those of metric dimension, these diameters or sockets 128 and 130 are preferred as they correspond to the diameters in which the hex end 32 of the inner socket or inner tie rod 34 is most commonly found.

The fitting 110 also includes an end portion 134 which extends between the socket 130 and the second end 114 of the fitting 110. The end portion 134 is in the shape of a semicircle defined by the outer wall 120 and a round inner wall 136 and is located opposite the slot 132. A claw 138 is attached to the end portion 134 of the fitting 110. The claw 138 includes a pair of parallel spaced-apart jaws 140 which are connected by a circular wall 142. The jaws 140 are spaced apart approximately one and seven-sixteenths inches. The jaws 140 and wall 142 form a first opening 144 within the claw 138. A receiving chamber 146 is formed between the claw 138 and the socket 130 by the end portion 134. The receiving chamber 146 is sized so as to receive the cylindrical end of an inner tie rod.

A circular disc 148 is located in the first end 104 of the shaft 102. The disc 148 is of the same approximate diameter as is the bore 108 of the shaft 102. A square aperture 150 extends through the disc 148 with the center of the aperture 150 being coaxial with the longitudinal axis of the shaft 102. The square aperture 150 is approximately one-half inch square to provide for the attachment of a socket wrench or impact wrench having a one-half inch drive. The disc 148 is press fit into the bore 108 at the first end 104 of the shaft 102. The disc 148 is then welded to the first end 104 of the shaft 102. A flexible retaining ring 152 is removably placed around the tool 100.

The fitting 110 is cut from a solid piece of round steel. The center of the fitting 110 is then drilled out using a four step drill, thereby creating the bore 118 in the stem 116, the chambers 122 and 124, and the inner wall 136 of the end portion 134. The fitting 110 is then heated and a hexagonal die is pressed into the chambers 122 and 124 to create the hexagonal sockets 128 and 130. The first end 112 of the fitting 110 is then machined to create the stem 116 and a portion of the outer wall 120 is cut away from the second end 114 to leave the end portion 134 as a semicircular wall. The stem 116 of the fitting 110 is then pressed into the bore 108 of the shaft 102 at the second end 106 and is attached thereto with a weld 154. The claw 138 is then attached to the second end 114 of the fitting 110 with a weld 156. The slot 132 is then machined into the tool 100.

The tool 100 of FIG. 6 may be used for the removal and replacement of inner tie rods 34 having hexagonal ends 32 from a rack and pinion assembly 44 utilizing the same method of removal and replacement as previously described with tool 10. In this case however, one of the sockets 128 or 130 will matingly engage the hex end 32 of the inner tie rod 34 to provide a clockwise or counterclockwise rotation of the inner tie rod.

The tool 100 may also be used for the removal and replacement of the inner tie rod 158 shown in FIGS. 7 and 8 having a cylindrical shaped end 160. The cylindrical end 160 includes two spaced apart parallel flat surfaces 162 which are located at the edge of the cylindrical end 160 nearest the shaft 50 of the rack 48. The surfaces 162 are spaced apart by approximately one and seven-sixteenths inches. FIGS. 7 and 8 show the tie rod 158 having a cylindrical end 160 threadably attached to the shaft 50 of a rack 48.

The method of removing and replacing an inner tie rod 158 from a rack and pinion steering mechanism 44 consists of the same initial steps as with an inner tie rod 34. The lock nut 80 is loosened and the outer tie rod 78 is removed from the inner tie rod 158. The outer clamp 76 and the inner clamp 72 are loosened so that the boot 68 may be removed from the inner tie rod 158 to expose the cylindrical end 160 and flat surfaces 162 of the inner tie rod 158.

The inner tie rod tool 100 is placed over the end of the tie rod 158 and is translated longitudinally towards the cylindrical end 160. The outer diameter of the cylindrical end 160 is greater than the distance between the jaws 140 and therefore cannot pass between the jaws 140. Therefore, as the claw 138 reaches the cylindrical end 160, the tool 100 is angled so that the shaft 164 extends out of the slot 132. This locates the claw 138 to the outside of the cylindrical end 160 so that the tool 100 can be further translated longitudinally moving the claw 138 past the cylindrical end 160. Once the claw 138 is past the cylindrical end 160, the tool 100 is then aligned with the tie rod 158 so that the cylindrical end 160 is located within the receiving chamber 146 and the shaft 164 is concentric with the bore 108. The tool 100 is then rotated until the jaws 140 of the claw 138 are aligned parallel with the flat surfaces 162 of the cylindrical end 160 so that the jaws 140 matingly engage the flat surfaces 162. The retaining ring 152 is then placed around the end portion 134 of the tool 100 and the cylindrical end 160 to assist in retaining the jaws 140 in place.

A socket wrench or impact wrench is than inserted into the square aperture 150 to provide a counterclockwise rotation of the tool 100 thereby unscrewing the inner tie rod 158 from the rack 48, while the rack 48 and tube 46 remain attached to the vehicle. A new inner tie rod 158 is then replaced in essentially the reverse manner. As can be seen the inner tie rod tool 10 is operative for the removal and replacement of inner tie rods 34 having various sizes of hexagonal ends 32 as well as for the removal and replacement of inner tie rods 158 having cylindrical ends 160 with flat surfaces 162.

Various features of the invention have been particularly shown and described in connection with the illustrated embodiments of the invention, however, it must be understood that these particular arrangements merely illustrate and that the invention must be given its fullest interpretation within the terms of the appended claims.

What is claimed is:

1. A tool particularly adapted to grip any of a plurality of different sizes of inner tie rod ends for the removal and replacement of an inner tie rod of a rack and pinion steering mechanism including:

a shaft having a longitudinal bore extending therein, said shaft adapted to receive a portion of said inner tie rod;

at least one polygonal socket attached to said shaft for gripping engagement of an inner tie rod end, said socket including a slot; and a claw attached to and spaced apart from said socket; said claw including two spaced apart parallel jaws for gripping engagement of an inner tie rod end.

and a receiving chamber disposed between said claw and said socket, said receiving chamber adapted to receive one end of said inner tie rod.

2. The tool of claim 1 including a flexible retaining ring disposed over the exterior of said socket and movable linearly along said tool to secure said jaws to said inner tie rod end.

* * * * *